US008478325B2

(12) United States Patent
McGowan et al.

(10) Patent No.: US 8,478,325 B2
(45) Date of Patent: Jul. 2, 2013

(54) LOW SAMPLE RATE PEAK POWER REDUCTION

(75) Inventors: Neil McGowan, Stittsville (CA); Marthinus Willem Da Silveira, Ottawa (CA); Peter Zahariev Rashev, Calgary (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 165 days.

(21) Appl. No.: 13/125,625

(22) PCT Filed: Sep. 15, 2010

(86) PCT No.: PCT/IB2010/054171
§ 371 (c)(1),
(2), (4) Date: Apr. 22, 2011

(87) PCT Pub. No.: WO2012/035372
PCT Pub. Date: Mar. 22, 2012

(65) Prior Publication Data
US 2012/0064848 A1    Mar. 15, 2012

(51) Int. Cl.
*H04B 7/00* (2006.01)

(52) U.S. Cl.
USPC .................................................... 455/522

(58) Field of Classification Search
USPC .............. 455/522, 127.1, 67.11, 114.3, 108, 455/126; 375/146, 296–298, 135, 261; 327/309
See application file for complete search history.

(56) References Cited

U.S. PATENT DOCUMENTS

| 6,236,864 | B1 | 5/2001 | McGowan et al. |
| 6,356,606 | B1* | 3/2002 | Hahm ........................... 375/350 |
| 6,687,511 | B2 | 2/2004 | McGowan et al. |
| 6,931,053 | B2 | 8/2005 | McGowan |
| 2003/0086507 | A1* | 5/2003 | Kim et al. ..................... 375/297 |
| 2007/0254592 | A1 | 11/2007 | McCallister et al. |
| 2009/0176466 | A1 | 7/2009 | Hellberg et al. |
| 2009/0191827 | A1 | 7/2009 | Hellberg |
| 2009/0310704 | A1 | 12/2009 | Jethanandani et al. |
| 2010/0029347 | A1 | 2/2010 | Hellberg |

OTHER PUBLICATIONS

International Search Report in corresponding PCT Application No. PCT/IB2010/054171 mailed on Oct. 7, 2011.
Written Opinion of the International Searching Authority in corresponding PCT Application No. PCT/IB2010/054171 mailed on Oct. 7, 2011.
International Preliminary Report on Patentability issued in corresponding International application No. PCT/IB2010/054171, completion date Dec. 5, 2012.

* cited by examiner

*Primary Examiner* — Junpeng Chen
(74) *Attorney, Agent, or Firm* — Potomac Patent Group, PLLC (57) ABSTRACT

Peak power reduction in transmit chains of radiocommunication devices is performed using a low sample rate. Filtering and, optionally, interpolation of a signal being processed for peak power reduction can be performed only in an error signal path or in both an error signal path and a primary signal path.

14 Claims, 8 Drawing Sheets

| FILTER TYPE | PARAMETERS | PAR@10^-5 | EVM |
|---|---|---|---|
| INLINE | IN/OUT RATE = 12.5Fc<br>NUM-PASSES=4<br>IF1=60 TAPS<br>EF1=57 TAPS | 6.0 dB | 8.4 % |
| ERROR ONLY | IN/OUT RATE = 12.5Fc<br>NUM-PASSES=4<br>PFi-1=33 TAPS<br>PFi-2=57 TAPS<br>F_del(PF1-1)=0 (NO FILTER)<br>F_del(PF2-1)=0.5<br>F_del(PF3-1)=0.25<br>F_del(PF4-1)=0.75 | 6.0 dB | 8.4 % |
| ERROR ONLY AT DOUBLE SAMPLE RATE | IN/OUT RATE = 25Fc<br>NUM-PASSES=2<br>PFi-1=66 TAPS<br>PFi-2=114 TAPS<br>F_del(PF1-1)=0 (NO FILTER)<br>F_del(PF2-1)=0.5 | 6.3 dB | 8.4 % |

LOW SAMPLE RATE PEAK POWER REDUCTION

TECHNICAL FIELD

The present invention generally relates to radio communication systems, devices and methods and, more particularly, to mechanisms and techniques for peak power reduction in such systems, devices and methods.

BACKGROUND

At its inception radio telephony was designed, and used for, voice communications. As the consumer electronics industry continued to mature, and the capabilities of processors increased, more devices became available use that allowed the wireless transfer of data between devices and more applications became available that operated based on such transferred data. Of particular note are the Internet and local area networks (LANs). These two innovations allowed multiple users and multiple devices to communicate and exchange data between different devices and device types. With the advent of these devices and capabilities, users (both business and residential) found the need to transmit data, as well as voice, from mobile locations.

The infrastructure and networks which support this voice and data transfer have likewise evolved. Limited data applications, such as text messaging, were introduced into the so-called "2G" systems, such as the Global System for Mobile (GSM) communications. Packet data over radio communication systems became more usable in GSM with the addition of the General Packet Radio Services (GPRS). 3G systems and, then, even higher bandwidth radio communications introduced by Universal Terrestrial Radio Access (UTRA) standards made applications like surfing the web more easily accessible to millions of users (and with more tolerable delay).

Even as new network designs are rolled out by network manufacturers, future systems which provide greater data throughputs to end user devices are under discussion and development. For example, the 3GPP Long Term Evolution (LTE) standardization project is intended to provide a technical basis for radiocommunications in the decades to come. Among other things of note with regard to LTE systems is that they will provide for downlink communications (i.e., the transmission direction from the network to the mobile terminal) using orthogonal frequency division multiplexing (OFDM) as a transmission format and will provide for uplink communications (i.e., the transmission direction from the mobile terminal to the network) using single carrier frequency division multiple access (FDMA).

Radiocommunication devices designed in accordance with the newer LTE standard, as well as those designed in accordance with other standards, may have to contend with high Peak to Average Power Ratio (PAPR) issues in their transmit chains. For example, radiocommunication devices which transmit on multiple carriers (frequencies) may generate compound signals having high PAPR which propagate through their transmit chain. In order to meet out-of-band emissions requirements, which may be imposed by the various radiocommunication standards, a power amplifier (and other components) which receives such compound signals and amplifies them prior to transmission needs to provide good linearity across a large dynamic range. This requirement makes power amplifiers used in such radiocommunication devices more expensive.

Accordingly, Peak Power Reduction (PPR) mechanisms and techniques have been implemented to reduce peak power in signals prior to their reaching, for example, the power amplifier. One approach which is sometimes used to reduce the peak power of an input waveform is to implement power clipping. In the power clipping approach, whenever the amplitude of the input signal is lower than a predetermined threshold, the input signal is passed to the output unchanged, and whenever the amplitude of the input signal exceeds the threshold, the output signal is clamped to the threshold level. Of course, the clipping operation destroys some of the information contained in the original signal. However, the user should be able to tolerate this loss of information as along as the threshold is kept sufficiently high.

Decresting is another approach for reducing the peak power of an input waveform, while avoiding the overshooting problems caused by the baseband filter in the power clipper. In this approach, an error signal is created that represents the amount by which the input signal exceeds a threshold. This error signal is then subtracted from the original input signal in order to form a decrested output signal.

Tone reservation is another method used to reduce the peak power of a signal, which method is typically used when an input signal is a multi-carrier signal or a multi-tone signal. In this method, the peak power is reduced by selecting or reserving a subset of a plurality of frequencies that constitute a multi-carrier symbol. These selected or reserved frequencies are used to create an appropriate impulse function, which is scaled, shifted, rotated and subtracted from the input multi-tone signal at each peak of the input signal that exceeds a predetermined threshold. Thus, one or several peaks may be clipped in this fashion and in a single iteration. However, reducing one or more peaks may cause the resulting waveform to exceed the clipping threshold at other positions. Therefore, the tone reservation process is repeated until a satisfactory peak-to-average reduction is achieved. The impulse functions created from the subset of reserved frequencies are usually pre-computed since the subset of reserved frequencies is usually known in advance.

However, when non-linear processing as described above forces a signal, such as a time-discrete signal, to stay within certain boundaries, this characteristic can generally only be guaranteed at sample instants. As the time-discrete signal (i.e., a digital signal) is converted into time-continuous form (i.e., an analog signal) in the transmit chain, peaks may pass through unclipped and/or be regrown and, therefore, some form of limiting is needed in the analog part of the transmit chain.

One solution to this problem is to perform the non-linear, peak power reduction processing at a sufficiently high sample rate. In other words, unclipped peaks can be avoided if a sufficiently high over sampling rate is used when processing the time-discrete signal for peak power reduction. In other peak power reduction circuitry and techniques, it is typical to use oversampling rates of three times the normal (Nyquist) sampling rate in order to ensure that unclipped peaks are effectively avoided.

This oversampling for peak power reduction, however, results in increased computational cost/complexity, which can be regarded as proportional to the oversampling rate and, therefore, can result in a substantial increase in hardware and power consumption of a transmitter. For example, the PPR signal processing (e.g., filters and clipping functions) need to operate at the higher sample rate, resulting in higher cost and power consumption of the digital circuitry.

SUMMARY

Peak power reduction in transmit chains of radiocommunication devices is performed using a low sample rate. Filtering and, optionally, interpolation of a signal being processed for peak power reduction can be performed only in an error signal path or in both an error signal path and a primary signal path.

According to one exemplary embodiment, a method for reducing peak power of a signal includes the steps of providing a first input signal to a first peak power reduction stage on both a first primary signal path and on a first error signal path, time shifting the first input signal on the first error signal path by a first predetermined time increment to generate a first time shifted input signal, generating a first error signal based on a peak power threshold using the first time shifted input signal, filtering the first error signal to remove out-of-band signal energy and to reverse time shift the first error signal by the first predetermined time increment to generate a first filtered error signal, and subtracting said first filtered error signal in said first error signal path from said first input signal in said first primary signal path to generate a first clipped output signal.

According to another exemplary embodiment, a transmitter includes a processor configured to generate signals for transmission, and a plurality of transmit chain elements configured to process said signals including a first stage of a peak power reduction circuit having a first input signal which is provided to a first primary signal path and to a first error signal path, the first stage of said peak power reduction circuit further comprising a first time shifting element configured to time shift the first input signal on the first error signal path by a first predetermined time increment to generate a first time shifted input signal, a first error signal generating element configured to generate a first error signal based on a peak power threshold using the first time shifted input signal, a first filter configured to filter the first error signal to remove out-of-band signal energy and to reverse time shift the first error signal by the first predetermined time increment to generate a first filtered error signal, and a first summer configured to subtract the first filtered error signal in the first error signal path from the first input signal in the first primary signal path to generate a first clipped output signal.

According to another exemplary embodiment, a method for reducing peak power of a signal includes the steps of providing an input signal to a first stage of peak power reduction processing on both a first primary signal path and on a first error signal path, generating a first error signal in the first error signal path based on a peak power threshold and the first input signal, subtracting the first error signal from the first input signal to generate a first clipped input signal on the first primary signal path, filtering the first clipped input signal to time shift the first clipped input signal by a first predetermined time increment and to remove out-of-band emissions to generate a first time shifted, clipped input signal, inputting the first time shifted, clipped input signal to a second stage of peak power reduction processing on both a second primary signal path and a second error signal path, generating a second error signal based on the peak power threshold using the first time shifted, clipped input signal, filtering the second error signal to remove out-of-band signal energy in the second error signal to generate a first filtered error signal, and subtracting the first filtered error signal in the second error signal path from the first time shifted, clipped input signal in the second primary signal path to generate a first clipped output signal.

According to another exemplary embodiment, a transmitter includes a processor configured to generate signals for transmission, and a plurality of transmit chain elements configured to process the signals including a first stage of a peak power reduction circuit which receives a first input signal on both a first primary signal path and on a first error signal path, a first error generating element configured to generate a first error signal in the first error signal path based on a peak power threshold and the first input signal, a first summer configured to subtract the first error signal from the first input signal to generate a first clipped input signal on the first primary signal path, a first filter configured to filter the first clipped input signal to time shift the first clipped input signal by a first predetermined time increment and to remove out-of-band emissions to generate a first time shifted, clipped input signal, a second stage of the peak power reduction circuit which receives the first time shifted, clipped input signal as a second input signal on both a second primary signal path and a second error signal path, a second error signal generating element configured to generate a second error signal based on the peak power threshold using the second input signal, a second filter configured to filter the second error signal to remove out-of-band signal energy in the second error signal to generate a first filtered error signal, and a second summer configured to subtract the first filtered error signal in the second error signal path from the first time shifted, clipped input signal in the second primary signal path to generate a first clipped output signal.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

According to exemplary embodiments low sample rate Peak Power Reduction (LPPR) enables PPR to be performed at lower sample rates, e.g., between one to two times the Nyquist rate, while maintaining similar performance to the higher sample rate PPR with lower implementation size, cost and power consumption. LPPR performs multiple clip and filter passes on the signal. Each pass operates on a different time shift of the signal, and optionally a fractional interpolated time shift, to make apparent peaks which would otherwise appear between samples at the low sample rate.

In general, multiple passes are employed for PPR to handle regrowth of the larger peaks that are above the clipping threshold for multiple samples. For the multiple sample peaks it may not matter whether the signal has an interpolated time shift or not. However for peaks with short duration (sharp peaks) a single pass is more effective at reducing the peak, but the peak can be missed if it occurs between samples at a low sample rate. Operating on a different (interpolated) fractional time shift of the signal for each pass maintains the multipass benefit for longer peaks, while providing visibility to between sample peaks that would otherwise only be possible by upsampling or increasing the sample rate of the signal.

Figure 1:
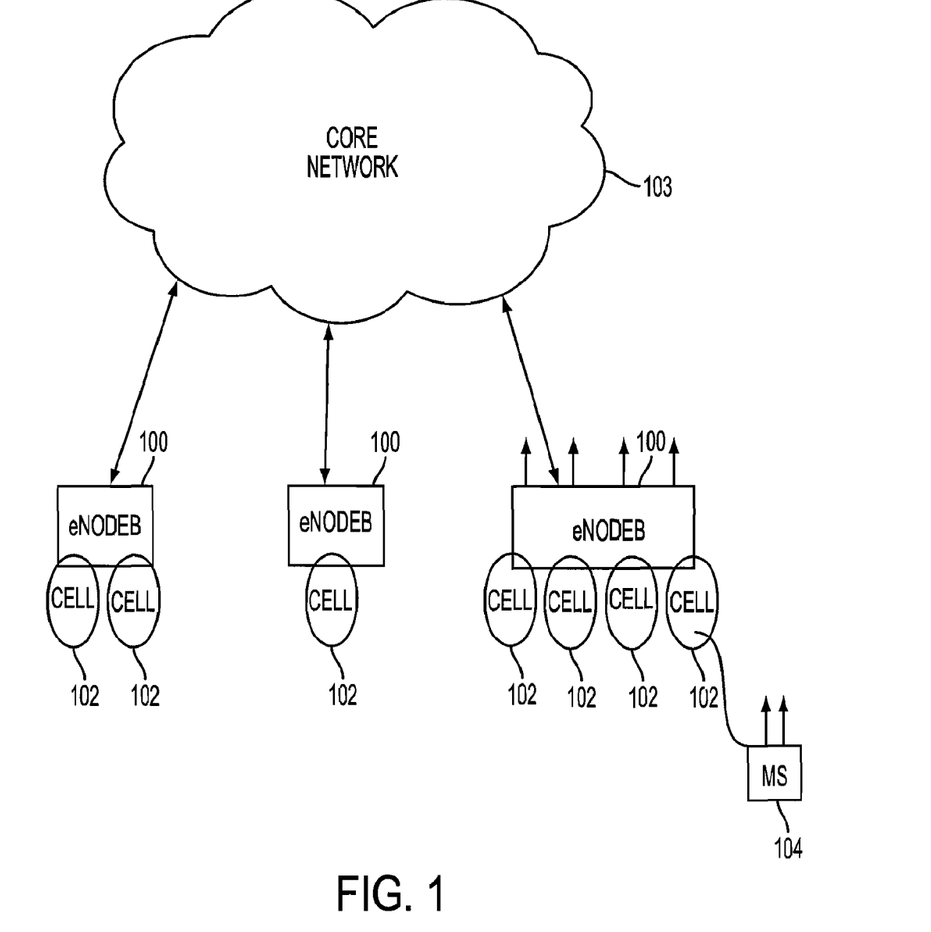
FIG. 1 illustrates an exemplary LTE access network in which exemplary embodiments can be implemented.
Figure 2:
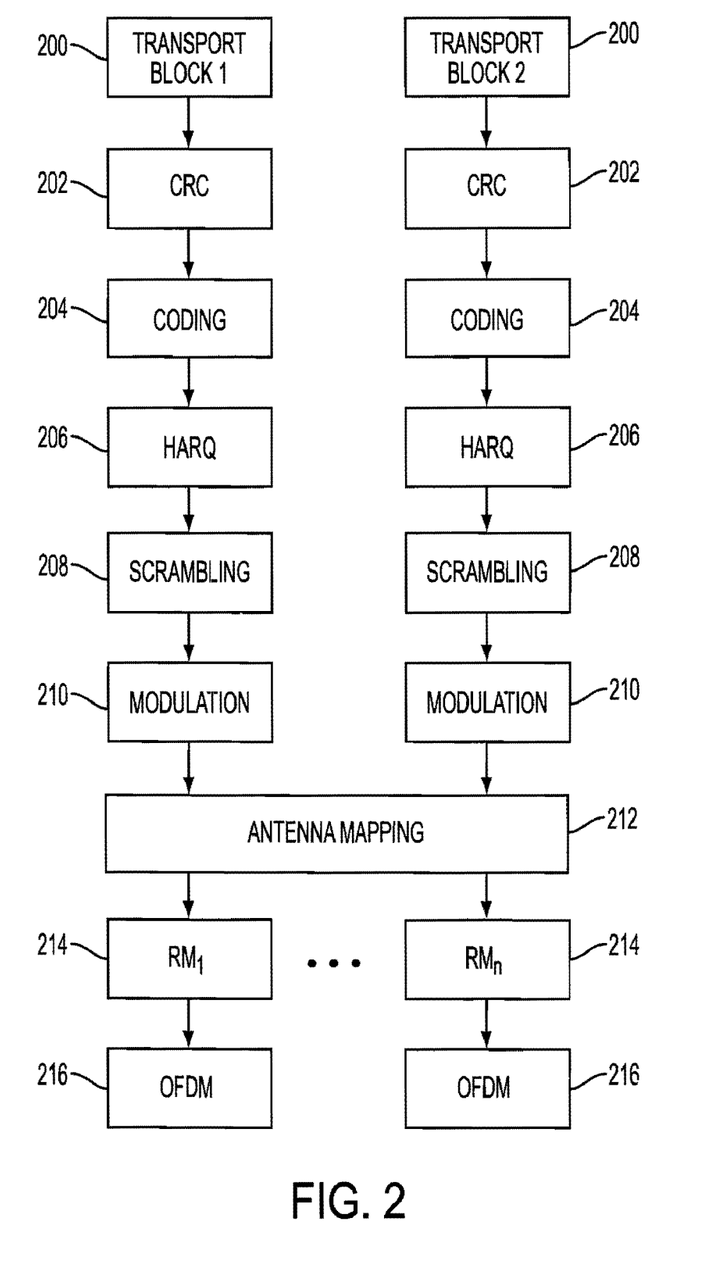
FIG. 2 depicts exemplary LTE signal processing with which exemplary embodiments can be associated.

To provide some context for a more detailed discussion of LPPR according to exemplary embodiments, consider first the exemplary radiocommunication system illustrated in FIGS. 1-2. Beginning with the radio access network nodes and interfaces in FIG. 1, it will be seen that this particular example is provided in the context of LTE systems. Nonetheless, the present invention is not limited in its applicability to transmitters or transmissions associated with LTE systems and can instead be used in any radiocommunication system including, but not limited to Wideband Code Division Multiple Access (WCDMA), CDMA, GSM, UTRA, E-UTRA, High Speed Packet Access (HSPA), UMB, WiMaX and other, systems, devices and methods. Since, however, the example in FIG. 1 is provided in terms of LTE, the network node which transmits and receives over the air interface is termed an eNodeB, several of which eNodeBs 100 are illustrated therein.

In the context of the air interface, each eNodeB 100 is responsible for transmitting signals toward, and receiving signals from, one or more cells 102. Each eNodeB includes multiple antennas, e.g., 2, 4, or more transmit antennas, and handles functions including, but not limited to coding, decoding, modulation, demodulation, interleaving, de-interleaving, etc., with respect to the physical layer of such signals. The eNodeBs 100 are also responsible for many higher functions associated with handling communications in the system including, for example, scheduling users, handover decisions, and the like. The interested reader who desires more information regarding transmit or receive functions associated with LTE or other systems in which these exemplary embodiments may be deployed is directed toward the book entitled "3G Evolution—HSPA and LTE for Mobile Broadband", to Erik Dahlman et al., published by Elsevier Ltd., 2007, the disclosure of which is incorporated by reference.

Nonetheless, to briefly discuss the baseband processing associated with the transmission of signals in the downlink (i.e., possibly transferred through the core network 103 to an eNodeB 100 and then into the cells 102 toward target mobile terminals or stations, e.g., MS 104 in FIG. 1), consider FIG. 2. Therein, two transport blocks of data 200 are being processed for transmission by an eNodeB 100 using spatial multiplexing. Cyclic redundancy check (CRC) bits are inserted at steps 202 to be used by the receiver to detect errors. Channel coding is applied to the transport blocks at steps 204 to provide protection to the payload data against the impairments presented by the radio channel. The hybrid automatic retransmission request (HARQ) steps 206 operate to extract or repeat code bits from the blocks of code bits provided by the channel encoder to generate a precise set of bits to be transmitted within a transmit time interval (TTI), e.g., based upon various criteria such as the number of assigned resource blocks, the selected modulation scheme and the spatial multiplexing order.

At step 208, the code words output from the HARQ block are scrambled (multiplied) by a bit-level scrambling sequence or mask, which aids the receive in suppressing interference to the radio signal. The selected data modulation, e.g., Quadrature Phase-Shift Keying (QPSK), 16 Quadrature Amplitude Modulation (QAM), or 64 QAM, is then applied at step 210 to transform blocks of scrambled bits into corresponding blocks of modulation symbols. These modulation symbols are then mapped to different antennas and/or different antenna ports at step 212. In LTE nomenclature, an antenna port corresponds to the transmission of a particular downlink reference signal which may, or may not, correspond to an actual, physical antenna. The symbols to be transmitted on each antenna are then mapped to respective resource blocks 214 and sent off for OFDM processing 216 prior to transmission by the eNodeB 100.

After the OFDM processing 216, the signal is in the time domain and LPPR according to exemplary embodiments described in more detail below can be performed. This is typically the point in the transmit chain processing where the sample rate is the lowest. After the OFDM processing stage, more processing is typically performed on the signal, such as resampling, gain control etc., and LPPR can be also be performed on the signal during these subsequent stages of processing in the time domain at any of the higher resample rates, but with increased filter hardware cost. In the case of a multi-carrier signals, LPPR will typically be performed after the carriers in the time domain have been added together.

Figure 3:
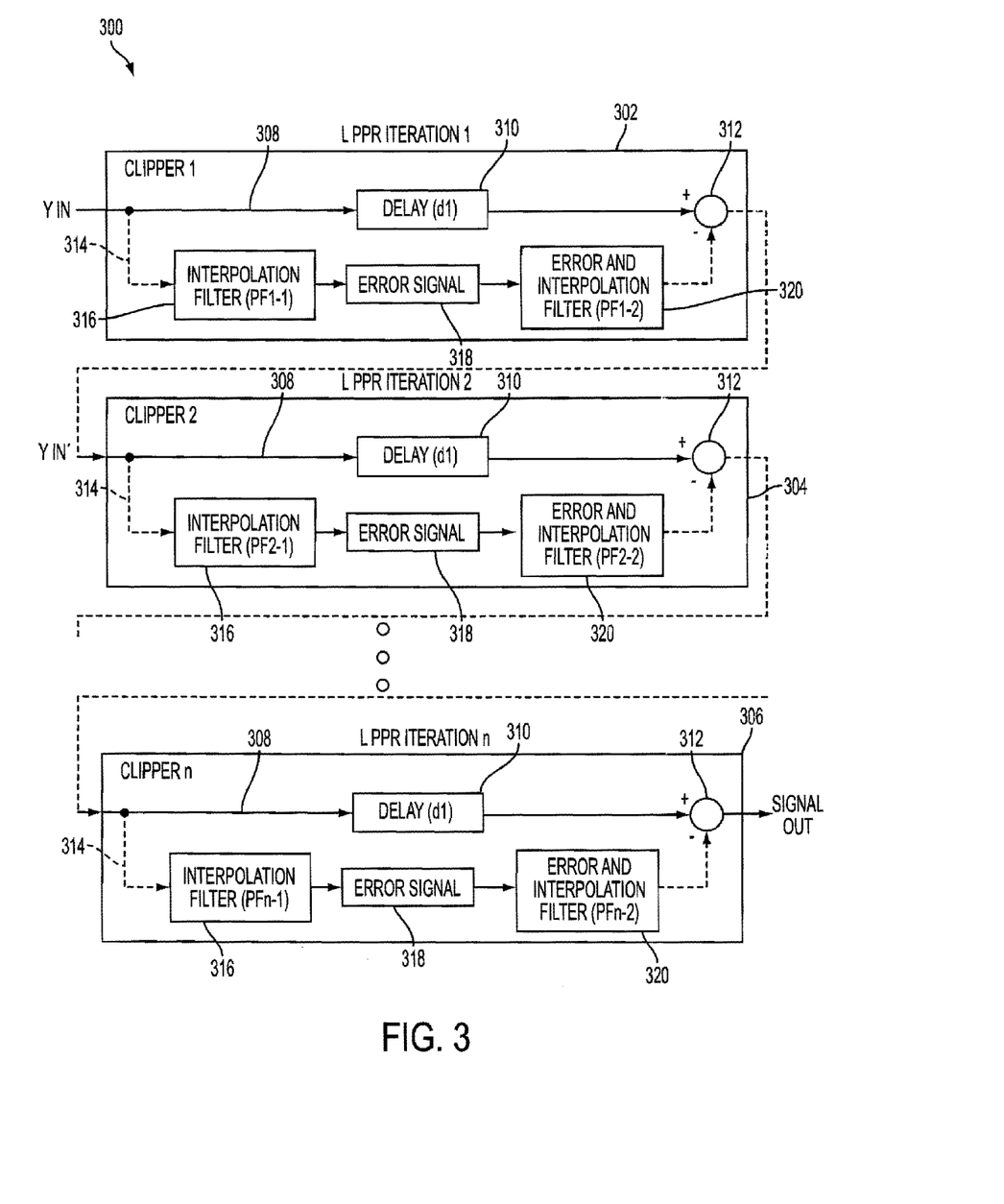
FIG. 3 shows a low sample rate peak power reduction circuit according to an exemplary embodiment.

A more detailed discussion of LPPR techniques according to an exemplary embodiment will now be provided with respect to FIG. 3. Therein, an n stage LPPR circuit 300 is illustrated. A signal $Y_{IN}$, having a sample rate which can, for example, be close to the Nyquist rate (e.g., between one and two times the Nyquist frequency for this signal) is input to a first stage 302 from an upstream transmit chain component (not shown in FIG. 3). Initially, it will be appreciated that each stage 302, 304 . . . 306 has two signal paths: a primary signal path (upper path in each stage), and an error signal path (lower signal path in each stage). For example, in stage 302, the received signal $Y_{IN}$ follows the primary signal path into a delay element 310 prior to reaching summer (subtractor) 312 where $Y_{IN}$ is subtracted from an output of the error signal path 314. The delay element 310 delays the input signal $Y_{IN}$ so that it is time-aligned with the output of the error signal path 314 in summer 312.

As can be seen in FIG. 3, most of the signal processing associated with LPPR 300 according to this exemplary embodiment takes place in the error signal path 314. In the error signal path, the input signal $Y_{IN}$ is first processed by an interpolation filter 316 which, generally, performs a sub-sample, interpolated time-shifting on the input signal and may also, according to some exemplary embodiments, interpolate the signal to a higher rate than the input rate, e.g., between 1 and 2 times the Nyquist rate of the input signal $Y_{IN}$. As discussed below, for each stage in the LPPR 300, the amount of time-shifting which is applied by interpolation filter 316 will typically vary. For example, in the first stage 302, the amount of time-shifting will typically be zero (since the sample has not yet been processed), while in the second and subsequent stages 304, 306, etc., a different amount of time-shifting will be applied by filter 316, e.g., 0.5 of a sample period, 0.25 of a sample period, etc.

Once the input signal $Y_{IN}$ has been sub-sample time shifted by filter 308, it passes to block 318 wherein an error signal associated with the sub-sample, time-shifted version of $Y_{IN}$ is calculated. In this context, the error signal e1(n) represents the portion of the input signal which exceeds a predetermined peak power threshold and can be calculated by function 318 as shown below.

$$e1(n) = \left[1 - \frac{\sqrt{T_{PPR}(i)}}{|y_{in}(n)|}\right] y_{in}(n) \quad (1)$$

where $T_{PPR}$ is a peak power reduction threshold value. This error signal e1(n) can be re-written as:

$$e1(n) = f(u) y_{in}(n) \quad (2)$$

where:

$$f(u) = \begin{cases} 0; & u \leq 1 \\ 1 - \frac{1}{\sqrt{u}}; & u > 1 \end{cases} \text{ and}$$

$$u(n) = \frac{|y_{in}(n)|^2}{T_{ppr}(i)} = \frac{1}{T_{ppr}(i)} |y_{in}(n)|^2 = T_F(i) |y_{in}(n)|^2$$

The error signal is then processed by an error and interpolation filter 320. The error and interpolation filter 320 implements a complimentary (relative to filter 316) inverse time-shift to align the input and error signals for summing at summer 312, as well filtering the error signal to reject out-of-band noise energy. If the filter 316 interpolates the input signal, then a corresponding decimation to the sample rate of the input signal is performed by error and interpolation filter 320 prior to generating its filtered output for summing. By placing the filtering and interpolation functions 316 and 320 which are performed by the LPPR 300 in the error signal path of each stage, exemplary embodiments enable the error and interpolation filters, e.g., filter 320 in stage 302, to be less complicated, e.g., by having fewer taps.

By subtracting the filtered error signal with the delayed input signal at summer 312, excess signal energy associated with a peak at a given time instant (if a peak exists at that time instant) is clipped. The clipped input signal is then input to another stage 304 in the LPPR 300, wherein it undergoes the same processing as described above, albeit with the same or with a different sub-sample, time shift. This process continues for as many stages as are present, with each successive stage operating on the input signal at a different sub-sample time instant (or, for some stages, possibly the same sub-sample time instant) until a final output is generated and passed to the next downstream element in the transmit chain. Thus the same reference numerals are used for the elements of stages 304 and 306 in FIG. 3 to identify the same or similar functions/components, albeit the operation of interpolation filters 316 and error and interpolation filters 320 will vary from stage to stage as described briefly above, and in more detail below. The number of stages n can be selected as a tradeoff between peak power reduction performance and processing cost/complexity.

According to one exemplary embodiment, the LPPR 300 can operate on the input signal at a sampling rate which is close to the Nyquist rate, e.g., between 1 and 2 times Nyquist, in which case filters 316 and 320 are fractional/sub-sample delay filters which perform complementary sub-sample time-shifts of the input signal without interpolating the signal. The sub-sample time shift intervals can be regularly spaced by 1/N, where if filter 316 implements a time-shift of (k−1)/N samples then the filter 320 performs a time shift of 1−(k−1)/N, 1=<k<=N. According to other exemplary embodiments, the filter 316 may also perform interpolation to increase the sample rate to, e.g., between 1-2 times the Nyquist rate, with filter 320 then performing a complementary decimation of the error signal. Additionally, it should be noted that the threshold $T_{PPR}$ can be the same for each stage of processing, may differ for each stage of processing, or some combination thereof.

Figure 4:
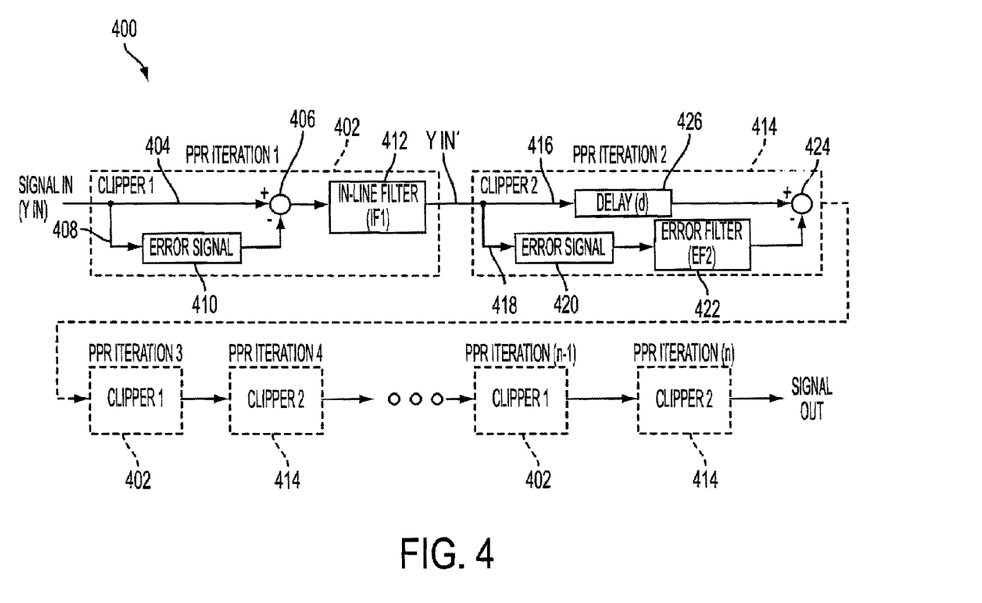
FIG. 4 shows a low sample rate peak power reduction circuit according to another exemplary embodiment.

Another exemplary embodiment of an LPPR circuit 400 is shown in FIG. 4. In this exemplary embodiment, filtering is performed in the primary signal path (in-line) as opposed to in the error signal path as described in the previous exemplary embodiment to handle the case where the input signal itself requires filtering to meet out-of-band emission requirements. Therein, in stage 402, an input signal $Y_{IN}$ is passed along a primary signal path 404 to a summer 406, and also along an error signal path 408. In the error signal path 408, the input signal is used to calculate and generate an error signal by error signal generation function 410 in the manner described above with respect to equations (1) and (2). This error signal is then presented to the summer 406, where it is added to the input signal $Y_{IN}$ to generate a clipped input signal.

The clipped input signal is then filtered by in-line filter 412 so that the clipped input signal meets out-of-band emission requirements associated with the particular type of transmitter (and radiocommunication standard) in which LPPR 400 is deployed. The in-line filter 412 also performs a sub-sample time shifting of the clipped input signal so that the next stage 414 of LPPR 400 operates on a different sample phase than the first stage 402. As with the previous exemplary embodiment of FIG. 3, the LPPR 400 may operate at close to the Nyquist rate of the input signal. Alternatively, the in-line filter 412 may also perform a low fractional rate interpolation to generate additional signal samples, e.g., to raise the effective sample rate of the signal up to a higher sample rate between one times and twice the Nyquist rate, where the filter does not increase the actual sample rate but acts as if a low rate interpolation and decimation are performed. More specifically, the in-line filter 412 efficiently generates values between the original sample points of the input signal, which can be described mathematically as data interpolation over an axis with arbitrarily fine resolution where the size of the interpolated data is one to two times bigger than the source. The in-line filters 412 can, for example, be implemented using a variety of filters which range from a low pass filter operating on each of the I and Q signals for a symmetrical, single pass band scenario to multiple passband, asymmetric complex filters, depending on the system configuration of interest.

The filtered and clipped output of in-line filter 412 (also referred to in FIG. 4 as $Y_{IN}'$) is passed on to the next stage 414 for additional processing. This stage 414 also includes a primary signal path 416 and an error signal path 418. An error signal is computed, by function 420, based on the input signal $Y_{IN}'$ and using, for example, equations (1) and (2) discussed above. The error signal is then filtered by error filter 422, which can have an odd number of taps and operates to minimize the out-of-band signal energy which appears after the clipping process of 420. The filtered error signal is then subtracted at summer 424 with the input signal $Y_{IN}'$, which has been delayed by delay element 426 to provide time alignment at the summer 424, thus clipping any peak which is found at the sample phase established by in-line filter 412.

The output of stage 414 of LPPR 400 may then be input to one or more additional pairs of stages 402, 414 as shown in FIG. 4, with the number of pairs of stages n being determined as a tradeoff between accuracy, complexity and cost. These downstream pairs of stages 402, 414 will be the same or similar to the initial pair of stages 402, 414 albeit the sub-sample phase difference (and possibly the interpolated sample points) associated with each pair of stages will differ.

Figure 5:
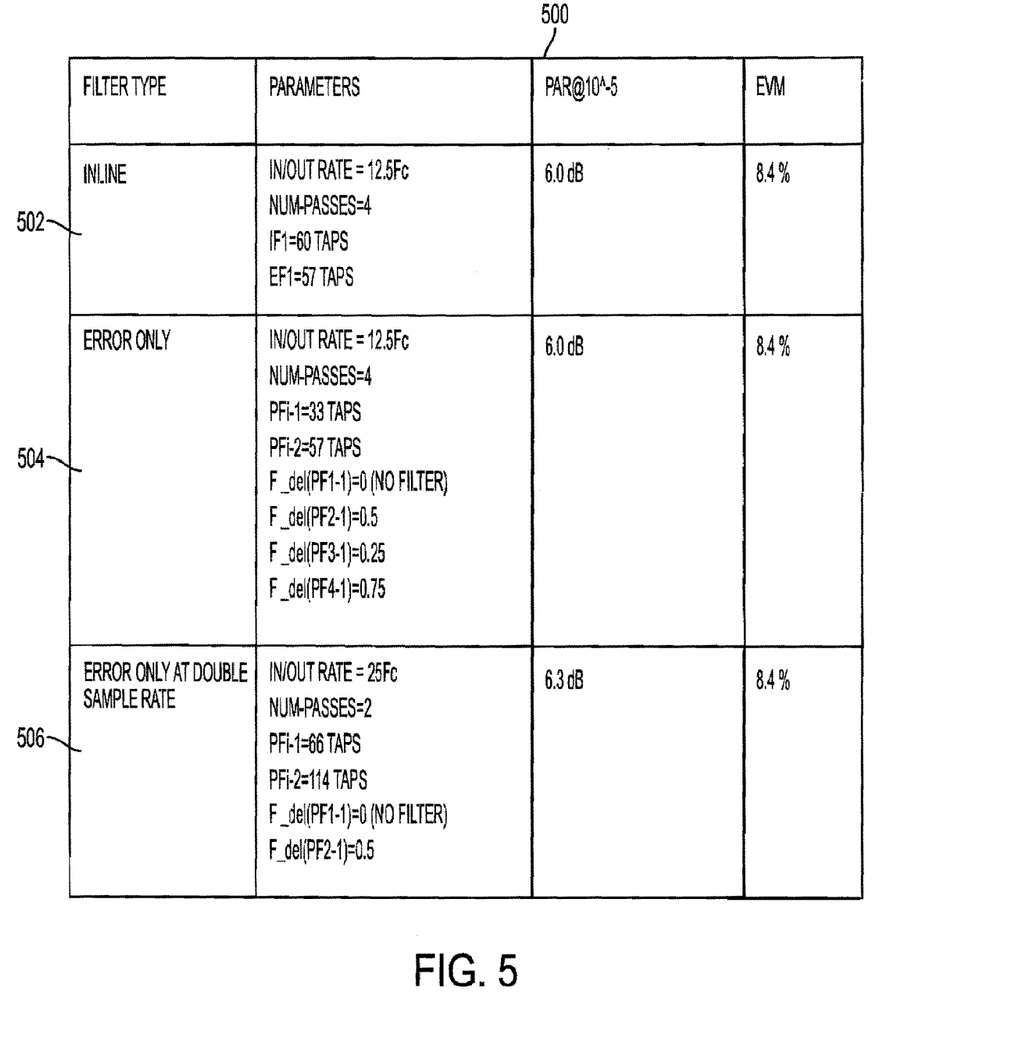
FIG. 5 is a chart depicting simulation results associated with exemplary embodiments.

FIG. 5 depicts a chart 500 containing simulation results associated with the afore-described exemplary embodiments for LPPR applied to 10 MHz LTE signals. Specifically, row 502 depicts simulation results for an exemplary in-line embodiment in accordance with FIG. 4 operating at close to the Nyquist rate and having four pairs of stages 402, 414. Each inline filter 412 in this simulation had 60 taps, and each error filter 422 had 57 taps. The simulation results showed a Peak-to-Average Ratio (PAR) of 6.0 dB with an Error Vector Magnitude (EVM) of 8.4%.

Row 504 of chart 500 depicts simulation results for an exemplary error only filter embodiment in accordance with FIG. 3 operating at close to the Nyquist rate and having four stages 302, 304, 306, n. In this simulated LPPR, the interpolation filters 316 had 33 taps and the error and interpolation filters 320 had 57 taps. In addition, the sub-sample time shift for each of the four stages was 0, 0.5, 0.25 and 0.75 sample periods, respectively. It should be appreciated by those skilled in the art that the filters used in actual implementations of these exemplary embodiments could be even smaller (fewer taps) than those which were used in this exemplary simulation.

Row 506 of chart 500 depicts simulation results for a double sample rate LPPR implementation according to the exemplary embodiment of FIG. 3, where two passes are used. These results show that, for example, for the same EVM the PAR is worse at 6.3 dB compared to 6.0 dB for the single (close to Nyquist) sample rate simulation results shown in rows 502 and 504. In summary, the following filter sizes were demonstrated to operate effectively on 10 MHz LTE signals by way of these simulations: inline filter structure at close to the Nyquist rate—88.5 taps per pass, error filter structure at close to the Nyquist rate—81.75 taps per pass, error filter structure at twice the Nyquist rate—147 taps per pass.

Various modifications on the foregoing exemplary embodiments are also contemplated. For example, the inline structure of the exemplary embodiment of FIG. 4 can further be simplified to use smaller in-line filters 412 and error filters 422 in the initial passes and a larger in-line filter 412 in the second to last pass which serves as a pulse-shaping/channel filter. In the double Nyquist rate embodiment (row 506), peak power reduction can be realized without phase shifting in the second stage since the double rate already allows for most of the peak growth to take place, in which case the number of taps per pass drops to 114. The performance associated with this latter embodiment will, however, be reduced as compared with that shown in row 506 while its complexity will be still larger than the solutions at close to the Nyquist rate.

Alternatively, the embodiments of FIG. 3 and FIG. 4 can be combined to form a hybrid LPPR in which all of the processing passes (stages) are implemented using the error filter structure of FIG. 3, i.e., stages 302, 304, etc., except for the last two stages in the LPPR processing chain. In this hybrid embodiment, the second to last pass (stage) utilizes an in-line stage 402 with a sufficiently large filter 412 to meet shaping and spectral requirements as per the air interface standard whose specifications the transmitter is intended to meet. The last pass of the hybrid embodiment then has a stage 414 which is also designed to meet these requirements. One advantage of this hybrid embodiment is that the error filter passes can have simpler filter requirements than those associated with the embodiment illustrated in FIG. 3 due to the presence of the in-line filter at the end of the LPPR processing chain. Regardless of the number LPPR stages which are present, this hybrid embodiment presents only one inline filter to impact the signal quality for levels below the PPR threshold and this in-line filter provides the dual function of pulse-shaping the signal to be output from the LPPR processing.

As mentioned above, the transmit processing techniques described herein may be used for various communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. The transmitter may, for example, be disposed within a radio base station, NodeB, eNodeB, or the like, to transmit information signals on a downlink radio channel. Alternatively, the transmitter may, for example, be disposed in a mobile unit, terminal device, user equipment, or the like to transmit information signals on an uplink radio channel. Regardless of the particular type of communication system in which these exemplary embodiments are presented, the transmit device will typically include the components illustrated generally in FIG. 6.

Figure 6:
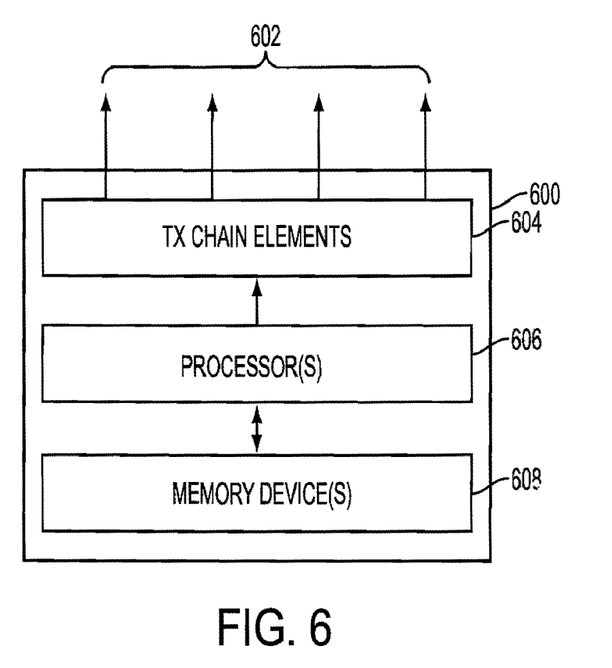
FIG. 6 depicts a transmitter in which exemplary embodiments can be implemented.

Therein, the transmitter 600 includes at least one, and potentially a plurality of, physical transmit antennas 602 (in this example numbering four, although more or fewer than four transmit antennas can be used). The physical transmit antennas 602 are connected to a processor 606 via transmit (TX) chain elements 604 which can include one or more of modulators, filters, upconverters, power amplifiers and LPPRs 300, 400 or variants thereof as described above, as will be appreciated by those skilled in the art. Processor(s) 606, in conjunction with memory device(s) 608 and TX chain elements 604 (and potentially other devices not shown) can operate to perform the transmit processes discussed above with respect to FIG. 2, e.g., by way of software stored therein, additional hardware or some combination of software and hardware. Thus, it will be apparent that exemplary embodiments also relate to software, e.g., program code or instructions which are stored on a computer-readable medium and which, when read by a computer, processor or the like, perform certain steps associated with transmitting information signals.

Figure 7:
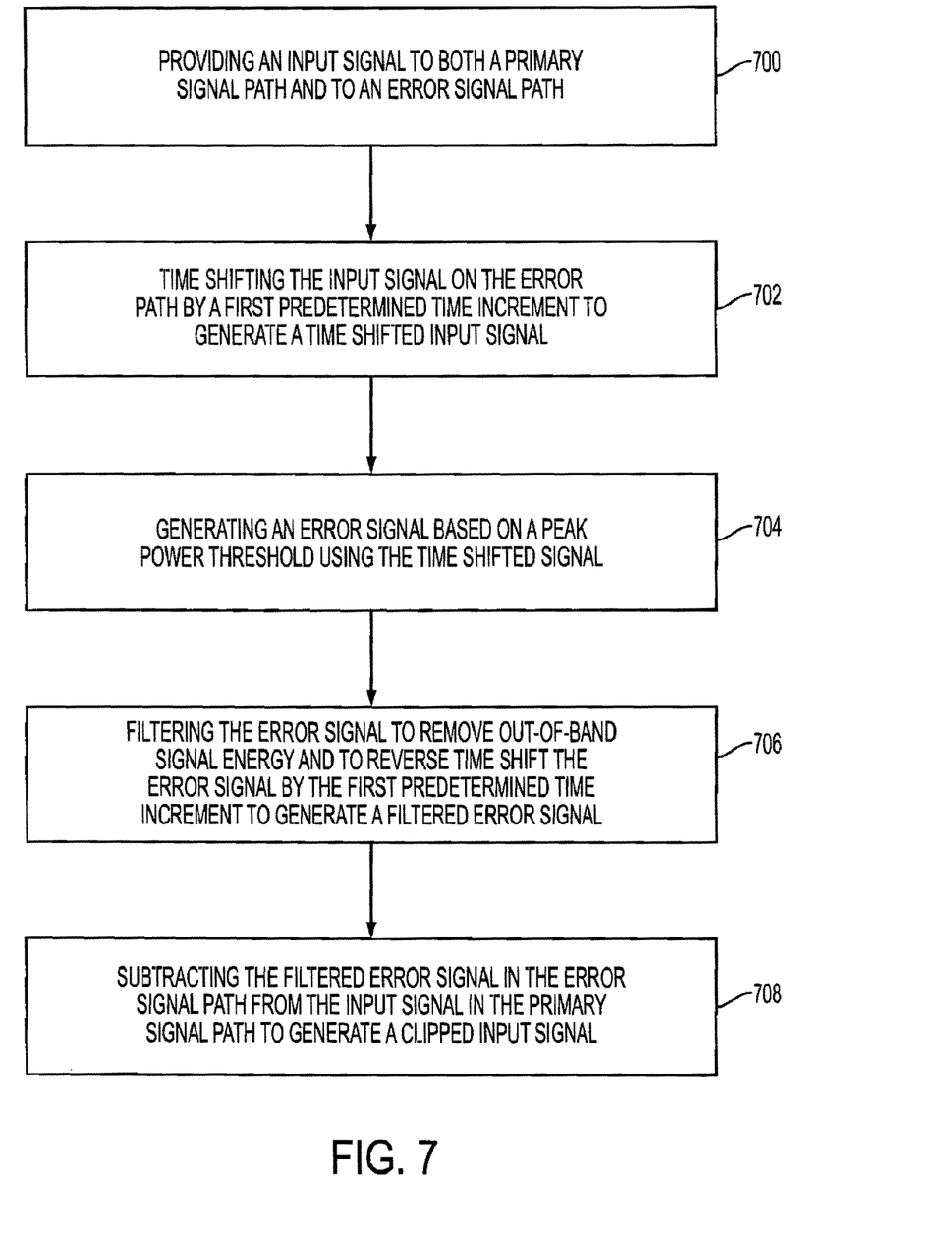
FIG. 7 is a flowchart illustrating a method for peak power reduction according to an exemplary embodiment.

A first method for low sample rate peak power reduction according to these exemplary embodiments is illustrated in FIG. 7, e.g., associated with the exemplary embodiment of FIG. 3. Therein, at step 700, an input signal is provided to both a primary signal path and to an error signal path. The input signal on error signal path is time shifted by a first predetermined time increment to generate a time shifted input signal at step 702. An error signal is generated based on a peak power threshold using the time shifted input signal at step 704. The error signal is filtered, at step 706, to remove out-of-band signal energy and to reverse time shift the error signal by the first predetermined time increment to generate a filtered error signal. Then, the filtered error signal in the error signal path is subtracted from the input signal in the primary signal path to generate a clipped input signal at step 708.

Figure 8:
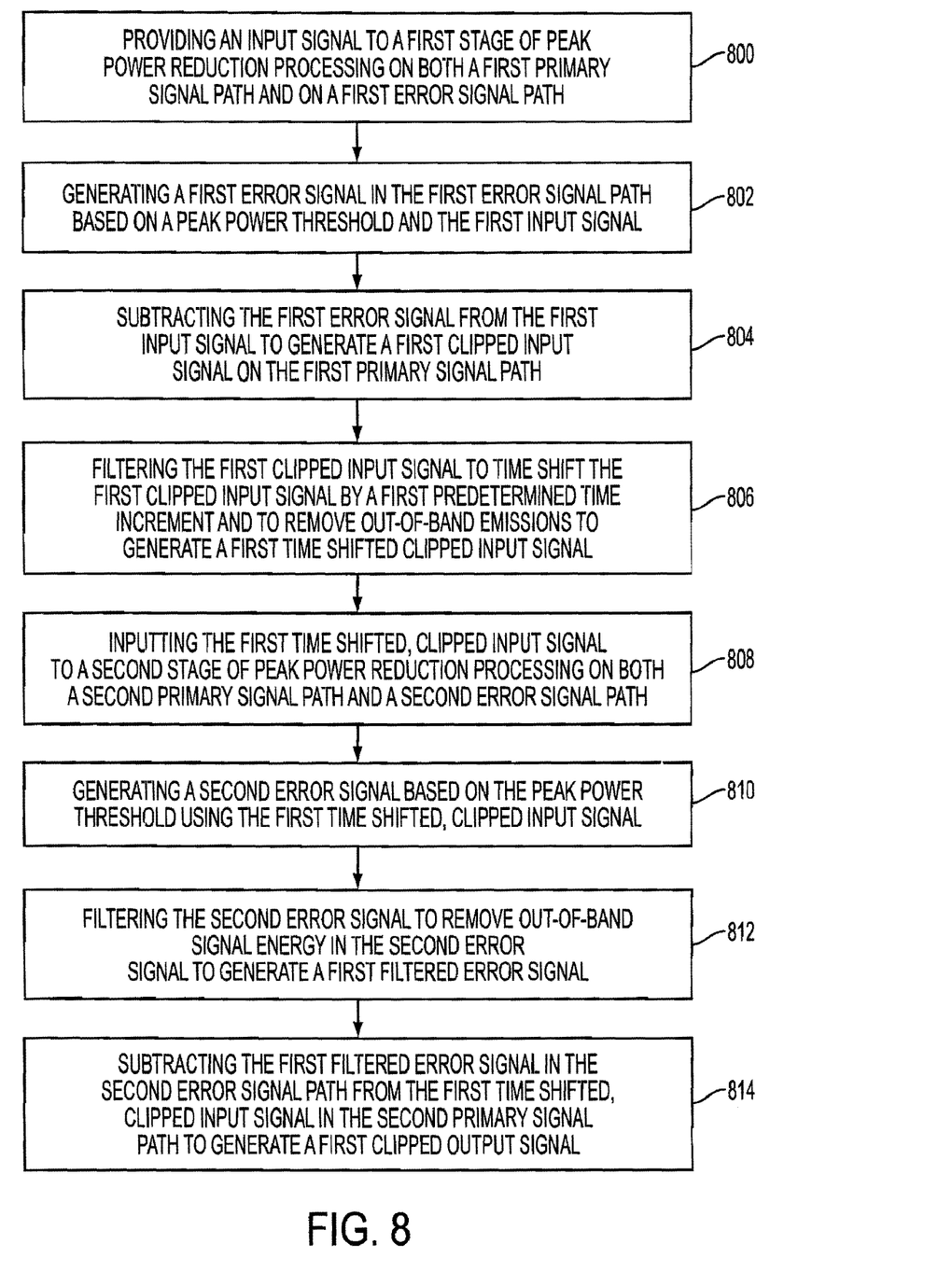
FIG. 8 is a flowchart illustrating a method for peak power reduction according to another exemplary embodiment.

A second method for low sample rate peak power reduction according to these exemplary embodiments is illustrated in FIG. 8, e.g., associated with the exemplary embodiment of FIG. 4. Therein, at step 800, an input signal is provided to a first stage of peak power reduction processing on both a first primary signal path and on a first error signal path. A first error signal is generated in the first error signal path based on a peak power threshold and the first input signal at step 802. The first error signal is subtracted from the first input signal (step 804) to generate a first clipped input signal on the first primary signal path. The first clipped input signal is filtered to time shift the first clipped input signal by a first predetermined time increment and to remove out-of-band emissions at step 806 to generate a first time shifted, clipped input signal.

The first time shifted, clipped input signal is input at step 808 to a second stage of peak power reduction processing on both a second primary signal path and a second error signal path. At step 810, a second error signal is generated based on the peak power threshold using the first time shifted, clipped input signal. This second error signal is filtered at step 812 to remove out-of-band signal energy in the second error signal to generate a first filtered error signal. Then, the first filtered error signal in the second error signal path is subtracted from the first time shifted, clipped input signal in the second primary signal path to generate a first clipped output signal at step 814.

The foregoing description of exemplary embodiments provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

The invention claimed is:

1. A method for reducing peak power of a signal, comprising:
   providing a first input signal to a first peak power reduction stage on both a first primary signal path and on a first error signal path;
   time shifting said first input signal on said first error signal path by a first predetermined time increment to generate a first time shifted input signal;
   generating a first error signal based on a peak power threshold using said first time shifted input signal;
   filtering said first error signal to remove out-of-band signal energy and to reverse time shift said first error signal by said first predetermined time increment to generate a first filtered error signal; and
   subtracting said first filtered error signal in said first error signal path from said first input signal in said first primary signal path to generate a first clipped output signal.

2. The method of claim 1, wherein said step of generating said first error signal is performed at a sample rate which is close to the Nyquist rate of said first input signal.

3. The method of claim 1, wherein said step of time shifting said first input signal further comprises:
   fractional rate interpolation of said first input signal to generate said first time shifted input signal having a sample rate of between one to two times a Nyquist rate of said first input signal.

4. The method of claim 3, wherein said step of filtering said first error signal further comprises:
   decimating said first error signal to return said first error signal to said sample rate of said first input signal.

5. The method of claim 1, further comprising:
   inputting said first clipped output signal to a second stage of peak power reduction processing as a second input signal on both a second primary signal path and on a second error signal path;
   time shifting said second input signal on said second error signal path by a second predetermined time increment to generate a second time shifted input signal;
   generating a second error signal based on said peak power threshold using said second time shifted input signal;
   filtering said second error signal to remove out-of-band signal energy and to reverse time shift said second error signal by said second predetermined time increment to generate a second filtered error signal; and
   subtracting said second filtered error signal in said second error signal path from said second input signal in said second primary signal path to generate a second clipped output signal,
   wherein said second predetermined time increment is different than said first predetermined time increment.

6. The method of claim 5, wherein said first predetermined time increment is zero and said second predetermined time increment is one half of a sample period.

7. The method of claim 5, further comprising:
   providing said second clipped output signal to a third stage of peak power reduction processing as a third input signal on both a third primary signal path and on a third error signal path;
   generating a third error signal in said third error signal path based on said peak power threshold and said third input signal;
   subtracting said third error signal from said third input signal to generate a third clipped output signal on said third primary signal path;
   filtering said third clipped output signal to time shift said third clipped output signal by a third predetermined time increment and to remove out-of-band emissions to generate a time shifted, clipped output signal;
   inputting said time shifted, clipped output signal to a fourth stage of peak power reduction processing as a fourth input signal on both a fourth primary signal path and a fourth error signal path;
   generating a fourth error signal based on said peak power threshold using said fourth input signal;
   filtering said fourth error signal to remove out-of-band signal energy in said fourth error signal to generate a third filtered error signal; and
   subtracting said third filtered error signal in said fourth error signal path from said fourth input signal in said fourth primary signal path to generate a fourth clipped output signal.

8. A transmitter comprising:
   a processor configured to generate signals for transmission; and
   a plurality of transmit chain elements configured to process said signals including:
   a first stage of a peak power reduction circuit having a first input signal which is provided to a first primary signal path and to a first error signal path, said first stage of said peak power reduction circuit further comprising:
   a first time shifting element configured to time shift said first input signal on said first error signal path by a first predetermined time increment to generate a first time shifted input signal;
   a first error signal generating element configured to generate a first error signal based on a peak power threshold using said first time shifted input signal;
   a first filter configured to filter said first error signal to remove out-of-band signal energy and to reverse time shift said first error signal by said first predetermined time increment to generate a first filtered error signal; and
   a first summer configured to subtract said first filtered error signal in said first error signal path from said first input signal in said first primary signal path to generate a first clipped output signal.

9. The transmitter of claim 8, wherein said first error signal generating element is configured to generate said first error signal at close to a Nyquist rate of said first input signal.

10. The transmitter of claim 8, wherein said first time shifting element is further configured to perform fractional rate interpolation of said first input signal to generate a first time shifted input signal having a sample rate of between one to two times a Nyquist rate of said first input signal.

11. The transmitter of claim 10, wherein first filter is further configured to decimate said first error signal to return said first error signal to said sample rate of said first input signal.

12. The transmitter of claim 8, further comprising:
a second stage of said peak power reduction circuit which receives said first clipped output signal as a second input signal, said second stage further including:
a second primary signal path and a second error signal path each of which receive said second input signal;
a second time shifting element configured to time shift said second input signal on said second error signal path by a second predetermined time increment to generate a second time shifted input signal;
a second error signal generating element configured to generate a second error signal based on said peak power threshold using said second time shifted input signal;
a second filter configured to filter said second error signal to remove out-of-band signal energy and to reverse time shift said second error signal by said second predetermined time increment to generate a second filtered error signal; and
a second summer configured to subtract said second filtered error signal in said second error signal path from said second input signal in said second primary signal path to generate a second clipped output signal,
wherein said second predetermined time increment is different than said first predetermined time increment.

13. The transmitter of claim 12, wherein said first predetermined time increment is zero and said second predetermined time increment is one half of a sample period.

14. The transmitter of claim 12, further comprising:
a third stage of said peak power reduction circuit which receives said second clipped output signal as a third input signal, said third stage further including:
a third primary signal path and a third error signal path each of which receive said third input signal;
a third error signal generating element configured to generate a third error signal in said third error signal path based on said peak power threshold and said third input signal;
a third summer configured to subtract said third error signal from said third input signal to generate a third clipped output signal on said third primary signal path;
a third filter configured to filter said third clipped output signal to time shift said third clipped output signal by a third predetermined time increment and to remove out-of-band emissions to generate a time shifted, clipped output signal;
a fourth stage of said peak power reduction circuit which receives said time shifted, clipped output signal as a fourth input signal on both a fourth primary signal path and a fourth error signal path;
a fourth error signal generating element configured to generate a fourth error signal based on said peak power threshold using said fourth input signal;
a fourth filtering configured to filter said fourth error signal to remove out-of-band signal energy in said fourth error signal to generate a third filtered error signal; and
a fourth summer configured to subtract said third filtered error signal in said fourth error signal path from said fourth input signal from said fourth primary signal path to generate a fourth clipped output signal.

* * * * *